R. R. NOLEN.
APPARATUS FOR COLLECTING AND HANDLING LINT.
APPLICATION FILED JAN. 2, 1919.
1,326,416.
Patented Dec. 30, 1919.
5 SHEETS—SHEET 1.
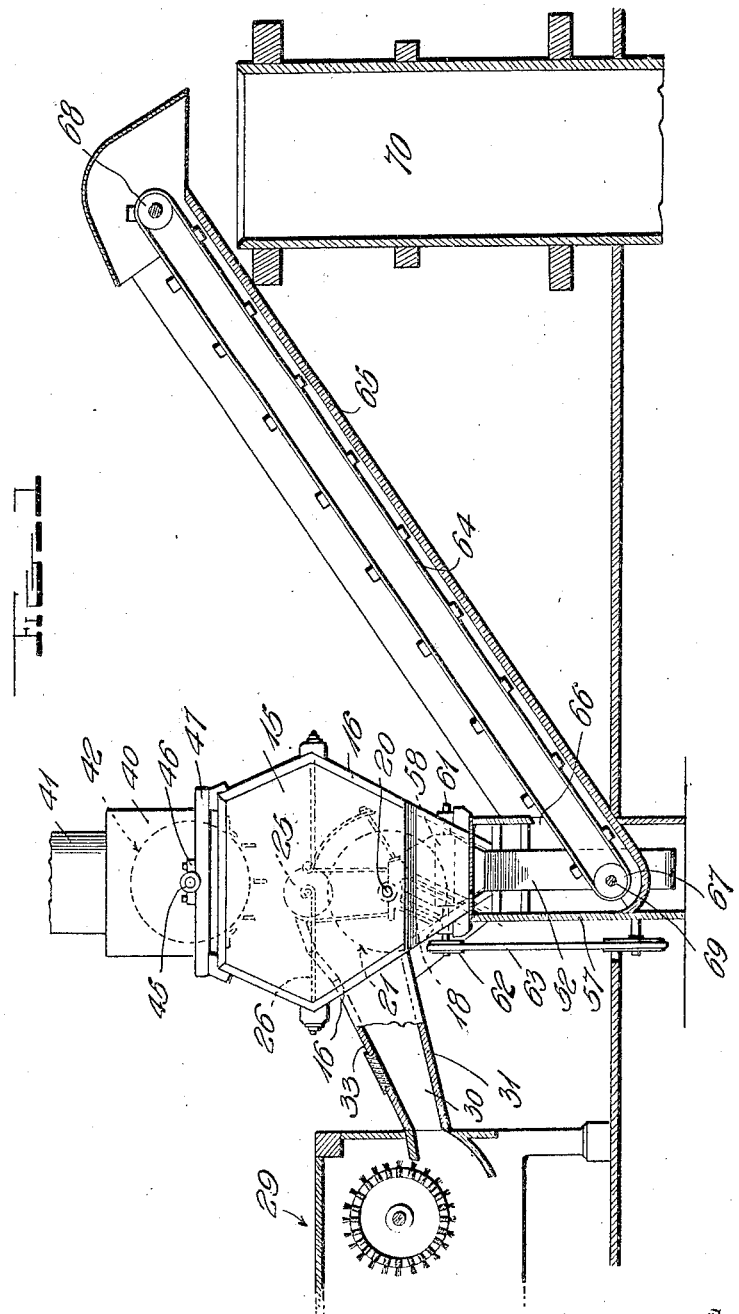
Inventor
Robert R. Nolen

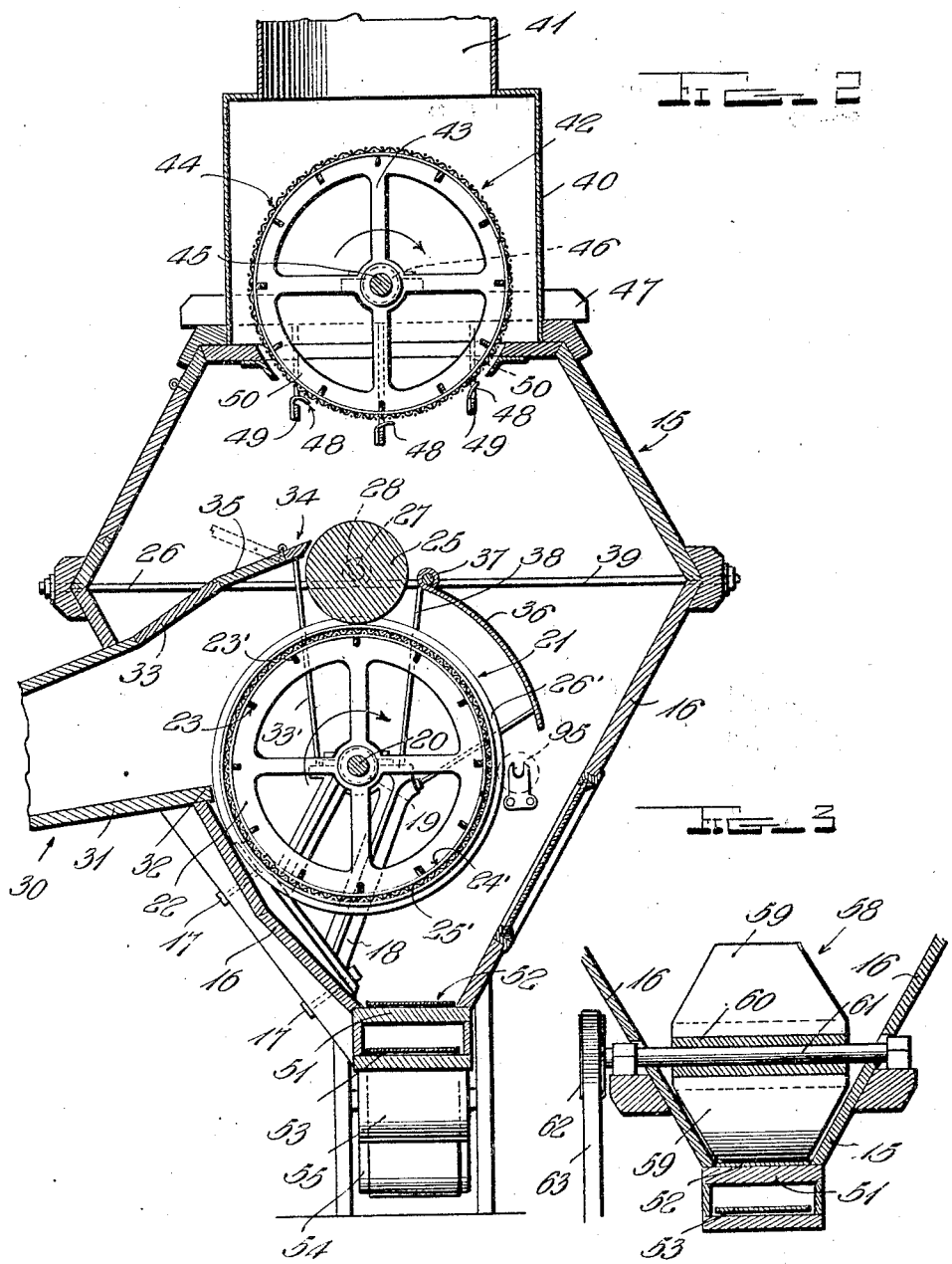

R. R. NOLEN.
APPARATUS FOR COLLECTING AND HANDLING LINT.
APPLICATION FILED JAN. 2, 1919.
1,326,416.
Patented Dec. 30, 1919.
5 SHEETS—SHEET 3.
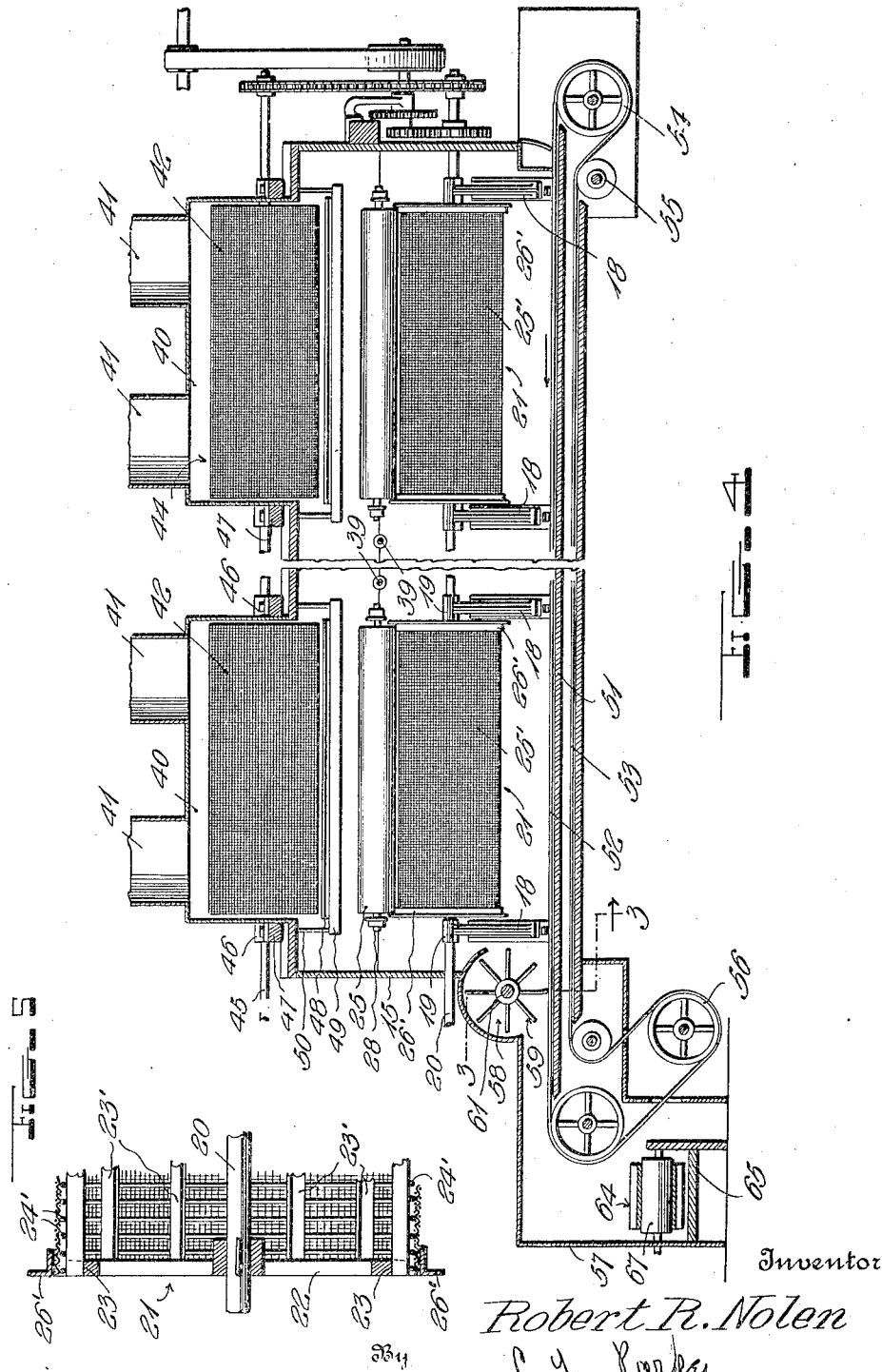
Inventor
Robert R. Nolen
C. H. Parker
Attorney

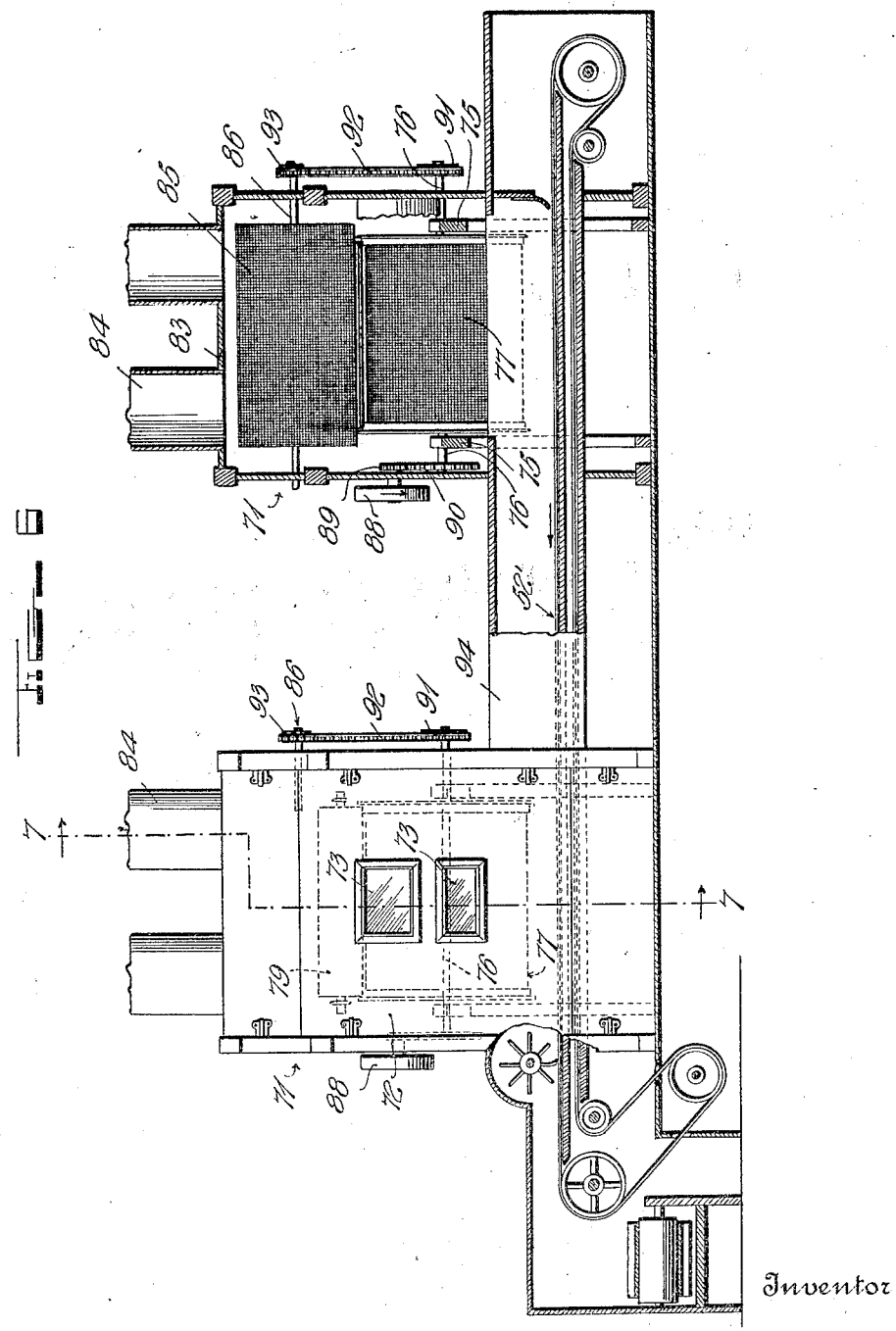

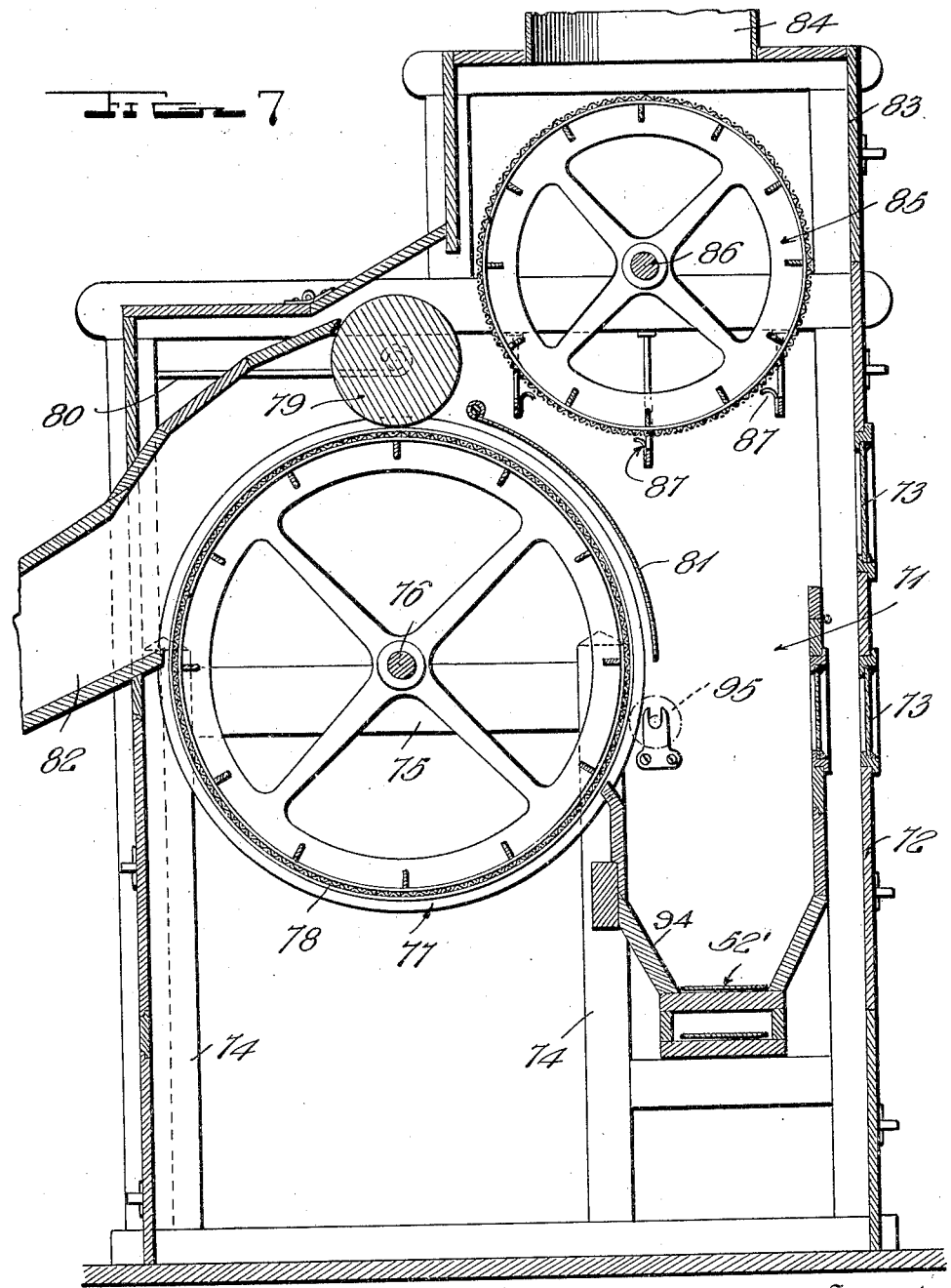

UNITED STATES PATENT OFFICE.

ROBERT RUFUS NOLEN, OF DALLAS, TEXAS.

APPARATUS FOR COLLECTING AND HANDLING LINT.

1,326,416.  Specification of Letters Patent.  Patented Dec. 30, 1919.

Application filed January 2, 1919. Serial No. 269,195.

*To all whom it may concern:*

Be it known that I, ROBERT R. NOLEN, a citizen of the United States, residing at Dallas, in the county of Dallas and State of Texas, have invented certain new and useful Improvements in Apparatus for Collecting and Handling Lint, of which the following is a specification.

My invention relates to apparatus for collecting and handling lint discharging from a linter, cotton gin or the like.

An important object of the invention is to provide a machine of the above mentioned character, adapted to thoroughly collect the lint discharging from the linter, thereby preventing its escape into the linter room, and which is further adapted to convey the collected lint to the lint baling press, thereby dispensing with the necessity of the lint being handled by operators.

A further object of the invention is to provide apparatus of the above mentioned character, which may be adapted for use in connection with linters or lint condensers of various types.

Other objects and advantages of the invention will be apparent during the course of the following description.

In the accompanying drawings forming a part of this specification and in which like numerals are employed to designate like parts throughout the same, Figure 1 is an end elevation of apparatus embodying my invention, parts being shown in vertical section, Fig. 2 is an enlarged central vertical sectional view through one section or unit of the apparatus, Fig. 3 is a transverse sectional view taken on line 3—3 of Fig. 4, Fig. 4 is a side elevation of apparatus embodying my invention, Fig. 5 is a detail section through one end of the condenser screen, Fig. 6 is a side elevation, parts in section, of a different form of apparatus embodying my invention, and, Fig. 7 is a transverse sectional view taken on line 7—7 of Fig. 6.

In the drawings, wherein for the purpose of illustration is shown a preferred embodiment of my invention, attention being called to Figs. 1 to 5 inclusive, the numeral 15 designates a condenser casing inclosing any suitable number of sections or units of the apparatus. This casing 15 preferably has its lower portion provided with inclined walls 16, converging downwardly, as shown.

Rigidly secured to the lower portions of one inclined wall 16, by means of bolts 17 or the like, are brackets 18, arranged interiorly of the casing 15. In each unit, there are two of these brackets, carrying bearings 19, receiving a rotatable line shaft 20.

Arranged between each pair of brackets 18, in each unit, is a rotatable condenser drum 21 (see Fig. 5) embodying open heads or spiders 22, rigidly secured to the shaft 20, as clearly shown in Fig. 5. These heads 22 are provided upon their peripheries with radially extending slots 23, which receive longitudinal bars 23'. Wire 24' is wrapped around the bars, in spaced turns, and a section of wire gauze 25' is passed about the wire and secured thereon by any suitable means. Light rings 26', L-shaped in cross-section, are secured to the ends of the drum, as shown in Fig. 5.

Arranged above and in contact with each condenser drum 21 is a compression roller 25, contacting with the periphery thereof, and operating between the radial flanges 26' to prevent longitudinal displacement thereof. The condenser roller 25 is free to partake of restricted vertical movements and is held against lateral displacement by means of resilient rods 26, the inner ends of which are provided with eyes 27, rotatably receiving rods or trunnions 28, carried by the ends of the roller 25.

The numeral 29 designates a linter, of any well known or preferred type, discharging the lint through a chute 30, leading into the casing 15. The chute 30 has its lower portion 31 projecting into the casing 15 and terminating in close proximity to the drum 21, as shown at 32, while its top portion 33 projects into the casing 15 and terminates in close proximity to the compression roller 25, as shown at 34. The top portion 33 is preferably equipped with a door 35. The top portion 33, near its inner end is supported by brace rods 33', as shown.

Covering the upper portion of the condenser drum 21, opposite the chute 30, is a curved guard 36, secured to a horizontal rod 37. This horizontal rod is attached to vertical and horizontal brace rods 38 and 39, as shown.

The numeral 40 designates a screen casing, rigidly secured to the top of the casing 5, of each unit. This screen casing has outlet pipes 41, at its top, which may lead to the atmosphere.

Rotatably mounted within each screen casing 40 is a horizontal screen drum 42, embodying heads 43, and having its periphery formed of a wire fabric or mesh 44, as shown. This screen drum is preferably identical in construction to the drum 25' and will not be described in detail. The screen drum of each unit is rigidly mounted upon an upper line shaft 45, journaled through bearings 46, secured to transverse beams 47, arranged exteriorly of the screen casing 40, as shown. Arranged near and beneath the lower portion of the screen drum 42, are flexible scrapers 48, carried by horizontal bars 49, supported by depending rods 50, anchored to the beams 47, and projecting downwardly into the casing 15, as shown. The screen drum is rotated in the direction of the arrow, in Fig. 2.

Arranged at the bottom of the casing 15 is a hollow horizontal support 51. The numeral 52 designates a collecting conveyer or belt, having its upper run operating upon the top of the support 51, within the lower end of the casing 15, while its lower run 53 operates within the hollow support 51, as shown. This collecting conveyer or belt is passed about end pulleys 54, and guide pulleys 55, as shown. The belt is also passed about a drive pulley 56, serving to operate the same. The conveyer is driven in the direction of the arrow, in Fig. 4. The discharge end of the conveyer 52 discharges into a casing 57, as shown.

Arranged near the discharge end of the conveyer 52, as more clearly shown in Fig. 3, is a rotatable feeder and agitator 58 embodying flexible flaps 59, carried by a rotatable drum 60, rigidly mounted upon a transverse shaft 61. This transverse shaft receives its rotation from a pulley 62, rigidly secured thereto engaged by a belt 63, extending downwardly for engagement with a drive pulley. The feeder and agitator 58 is arranged above the upper run 52 of the endless conveyer and is adapted to contact therewith and with the compressed lint thereon, to effect the further discharge of the same from the end of the conveyer 52, as is obvious.

Arranged near the discharge end of the collecting conveyer 52 is an elevating conveyer 64, arranged at a right angle thereto. This conveyer 64, operates within a casing 65, which projects through an opening 66, in the casing 57. The lower end of the elevating conveyer 64, is arranged beneath the discharge end of the collecting conveyer 52, and receives the lint therefrom. The elevating conveyer 64 is passed about pulleys 67 and 68, and receives its movement preferably from the lower pulley 67, which is rigidly secured to a shaft 69, driven by any suitable means. The elevating conveyer 64 discharges the lint into a lint baling press 70, or to any other suitable point.

All parts of my apparatus are inclosed as much as possible, to prevent the escape of the lint and dust into the linter room.

The operation of this form of apparatus is as follows:

The air laden with the lint and dust, discharges from the linter 29 into and through the chute 30, entering the lower portion of the casing 15. The larger particles of lint contained in this air contact with the revolving condenser drum 21, and while thereon are subjected to the action of the compression roller 25. The action of this roller produces a temporary batting, which is heavier than the lint and heavier than the air. This temporary batting falls by gravity from the lower portion of the condensing drum and is taken up by the collecting conveyer and transferred to the elevating conveyer. This elevating conveyer conducts the same to the baling press or the like. The air laden with dust and the finer particles of lint, which are not caught by the condenser drum, passes upwardly and through the revolving screen drum 42. This drum permits of the escape of air and dust which pass to the atmosphere through the pipes 41, while the lint is caught upon the exterior surface of the drum 42. This lint is continuously removed from the exterior surface of the drum, to prevent the same being collected, by the scrapers 48, such lint settling to the lower end of the casing 15, and finding its way to the collecting conveyer.

In Figs. 6 and 7, the numeral 71 designates a casing having its rear side provided with a panel 72, which may be removed, when desired. This panel is provided with an opening covered by glass 73.

The casing 71 receives the frame 74 of the ordinary condenser, used in connection with a linter. This frame embodies upper horizontal beams 75, supporting a horizontally rotatable shaft 76, rigidly secured to which is a condenser drum 77, having its periphery covered with wire fabric 78. This drum is preferably constructed identical with the condenser drum 21. Arranged above the condenser drum 77 is a compression roll 79, free to partake of restricted vertical movement, and arranged upon the upper portion of the drum 77, upon the right side of the roll 79. A chute 82 communicates with the linter (not shown) and discharges into the casing 71, upon one side of the drum 78, and compression roll 79, as shown.

The numeral 83 is a screen casing having pipes 84 leading to the atmosphere, exteriorly of the lint room. Rotatably mounted within the casing 83 is a horizontal screen drum 85, carried by the shaft 86. This screen drum is identical with the screen drum 42, and will not be described in detail. Scrapers 87 are arranged at the lower portion of the screen drum 85 and serve to remove the partially batted cotton therefrom.

As clearly shown in Fig. 6, the casings 71 are spaced apart, and the shaft 76 in each unit receives its rotation from a pulley 88, driving a gear 89. This gear engages a driving gear 90, secured to the shaft 76. The shaft 76 is provided at one end with a sprocket wheel 91, engaged by a sprocket chain 92, extending upwardly to engage a sprocket wheel 93, rigidly secured to the shaft 86.

As more clearly shown in Fig. 7, a collecting trough 94 is arranged upon one side of the condenser drum 78, and near the lower portion thereof. This condenser trough is arranged to catch the batting falling from the condenser drum 77 and also the partially batted cotton scraped from the screen drum 85. The collector conveyer 52', which is preferably identical with the collector conveyer 52, has its upper run operating through the lower portion of the trough 94, as shown.

As more clearly shown in Figs. 2 and 7, the test roll 95 is adapted to be removably and rotatably mounted within the casing, near and to one side of the condenser drum. The cotton batting is adapted to be wrapped upon this roll during the operation of the machine, and when a proper amount is wound thereon, the upstanding roll is removed. This testing roll when it is removed from the interior of the casing exhibits the cotton batting to be removed therefrom, whereby the cotton batting or lint can be examined and weighed, and a strict account can be kept for each linter machine at any desired time.

It is to be understood that the forms of my invention herewith shown and described are to be taken as preferred examples of the same and that various changes in the shape, size, and arrangement of parts may be resorted to without departing from the spirit of the invention or the scope of the subjoined claims.

Having thus described my invention what I claim is:

1. In apparatus of the character described, the combination with a condenser drum, of a casing inclosing the condenser drum and having a trough projecting downwardly beyond the condenser drum for receiving batted lint therefrom, a compression roll arranged in coöperative relation to the drum, means to supply lint into the casing so that it will pass between the condenser drum and roll, a screen drum arranged within the casing, an outlet conduit for the casing receiving air passing through the screen drum, means to remove lint from the screen drum, a conveyer operating within the trough, an agitator arranged adjacent the discharge end of said conveyer and adapted to coöperate therewith, and means to drive the two drums.

2. In apparatus of the character described, the combination with a condenser drum, of a casing inclosing the condenser drum and provided with a trough extending beneath the same upon one side of the drum, a compression roll arranged in coöperative relation to the drum, means to supply lint into the casing so that it passes between the drum and roll, a conveyer operating within the trough, a rotatable agitator arranged adjacent the discharge end of said conveyer and providing flexible arms to coact therewith, a screen drum arranged within the casing, a conduit arranged to receive air passing through the screen drum, and means to remove lint adhering to the screen drum.

3. In apparatus of the character described, the combination with a condenser drum, a compression roll, of a casing inclosing the condenser drum and provided with a trough extending beneath the same upon one side of the drum, a conveyer operating within the trough, a chute to supply lint to the casing and having its lower edge terminating in proximity to said drum and its upper edge terminating in proximity to the roll, whereby the lint passes between the drum and roll, a screen drum arranged within the upper portion of the casing above the condenser drum, an outlet conduit arranged above the screen drum to receive air passing therethrough, means to remove lint adhering to the exterior surface of the screen drum, and a guard arranged between the two drums.

In testimony whereof I affix my signature in presence of two witnesses.

ROBERT RUFUS NOLEN.

Witnesses:
A. E. FLOWERS,
IRA B. BATES.